US008190820B2

(12) United States Patent
Thantry et al.

(10) Patent No.: US 8,190,820 B2
(45) Date of Patent: May 29, 2012

(54) OPTIMIZING CONCURRENT ACCESSES IN A DIRECTORY-BASED COHERENCY PROTOCOL

(75) Inventors: Hariharan Thantry, Santa Clara, CA (US); Akhilesh Kumar, Sunnyvale, CA (US); Seungjoon Park, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1011 days.

(21) Appl. No.: 12/157,792

(22) Filed: Jun. 13, 2008

(65) Prior Publication Data
US 2009/0313435 A1 Dec. 17, 2009

(51) Int. Cl.
G06F 12/08 (2006.01)
G06F 13/14 (2006.01)

(52) U.S. Cl. ........ 711/118; 711/141; 711/144; 711/146; 711/167; 711/E12.026

(58) Field of Classification Search .................. None
See application file for complete search history.

(56) References Cited

U.S. PATENT DOCUMENTS

| | | | |
|---|---|---|---|
| 4,426,681 A | 1/1984 | Bacot et al. | |
| 5,737,759 A | 4/1998 | Merchant | |
| 5,832,276 A | 11/1998 | Feiste et al. | |
| 6,065,101 A | 5/2000 | Gilda | |
| 6,230,020 B1 * | 5/2001 | Kantola et al. | 455/466 |
| 6,526,498 B1 * | 2/2003 | Mirsky et al. | 712/11 |
| 2005/0055502 A1 * | 3/2005 | Hass et al. | 711/122 |
| 2005/0160132 A1 * | 7/2005 | Van Doren et al. | 709/200 |
| 2006/0277369 A1 * | 12/2006 | Tsien | 711/141 |
| 2007/0022252 A1 | 1/2007 | Cen | |
| 2007/0055827 A1 * | 3/2007 | Tsien | 711/141 |
| 2007/0073994 A1 * | 3/2007 | Zohar et al. | 711/173 |
| 2007/0168712 A1 * | 7/2007 | Racunas et al. | 714/12 |
| 2007/0233966 A1 * | 10/2007 | Chinthanmani et al. | 711/146 |
| 2008/0005486 A1 * | 1/2008 | Mannava et al. | 711/146 |
| 2009/0113139 A1 | 4/2009 | Pudipeddi et al. | |
| 2009/0172200 A1 * | 7/2009 | Morrison et al. | 709/248 |

FOREIGN PATENT DOCUMENTS

DE 11 2004 001 984 8/2006

OTHER PUBLICATIONS

U.S. Appl. No. 11/647,618, filed Dec. 29, 2006, entitled "System and Method for a 3-Hop Cache Coherency Protocol," by Phanindra K. Mannava, et al.
The State Intellectual Property Office of the People's Republic of China, Notice on the First Office Action mailed Mar. 24, 2011 in Chinese application No. 200910146203.0.
German Patent Office, Office Action for DE Application No. 10 2009 023 898.0-53 (with English Translation), dated Jun. 21, 2010, 5 pgs.

(Continued)

Primary Examiner — Michael Krofcheck
(74) Attorney, Agent, or Firm — Trop, Pruner & Hu, P.C.

(57) ABSTRACT

In one embodiment, the present invention includes a directory to aid in maintaining control of a cache coherency protocol. The directory can be coupled to multiple caching agents via an interconnect, and be configured to store a entries associated with cache lines. The directory also includes logic to determine a time delay before the directory can send a concurrent snoop request. Other embodiments are described and claimed.

16 Claims, 7 Drawing Sheets

OTHER PUBLICATIONS

Great Britain Intellectual Property Office, Combined Search and Examination Report under Sections 17 and 18(3), dated Sep. 4, 2009, in related Great Britain Application No. GB0909592.8.

Japanese Patent Office, Office Action mailed Nov. 29, 2011 in Japanese application No. 2009-141086.

* cited by examiner

OPTIMIZING CONCURRENT ACCESSES IN A DIRECTORY-BASED COHERENCY PROTOCOL

BACKGROUND

Many computing systems include multiple processors and input/output (I/O) agents that interface with I/O and storage devices, and also include coherent memories, which can be a coherent cache for multiple processors. Since one or more caches are often included in these multiple processors, a coherent cache means that the processor shares its cache with other agents that may request access to the cache (e.g., other processors or I/O agents).

When a computing system includes multiple coherent cache memories and multiple requesting agents like the multiple processors and I/O agents, a conflict may occur when two agents request access to a cache line at the same time. To alleviate this problem, a system of arbitrating for access to a specific cache line between multiple request agents is typically accomplished using a cache coherency protocol. Oftentimes, a central entity such as a directory is used to maintain cache coherency by storing entries indicating location and state of various cache lines present in one or more of the cache memories. Cache coherency algorithms define the behavior of reads and writes to the same memory location. The coherence of caches is obtained if the following conditions are met: (1) a read made by a processor P to a location X that follows a write by the same processor P to X, with no writes of X by another processor occurring between the write and the read instructions made by P, must always return the value written by P; (2) a read made by a processor P1 to location X that follows a write by another processor P2 to X must return the written value made by P2 if no other writes to X made by any processor occur between the two accesses; and (3) a read made by a processor P1 to location X that follows a write by another processor P2 to X must return the written value made by P2 if no other writes to X made by any processor occur between the two accesses However, as the number of caches and/or requesting agents increases in a computing system, the complexity of maintaining cache coherency, and the number of messages required between these agents also increases as the cache coherency protocol must be adapted to the newly scaled computing system. Still further, to maintain coherency, an increased number of messages must be sent, which increases traffic on the interconnect, reducing bandwidth for other communications, and further leading to latencies in replying to requests for data.

DETAILED DESCRIPTION

In various embodiments, properties of an underlying interconnect of a system that couples various system agents can be used to increase concurrency of message processing at a directory used for cache coherency, reducing bandwidth on the interconnect and reducing the overall latency for miss processing at each individual core of the system.

Figure 1:
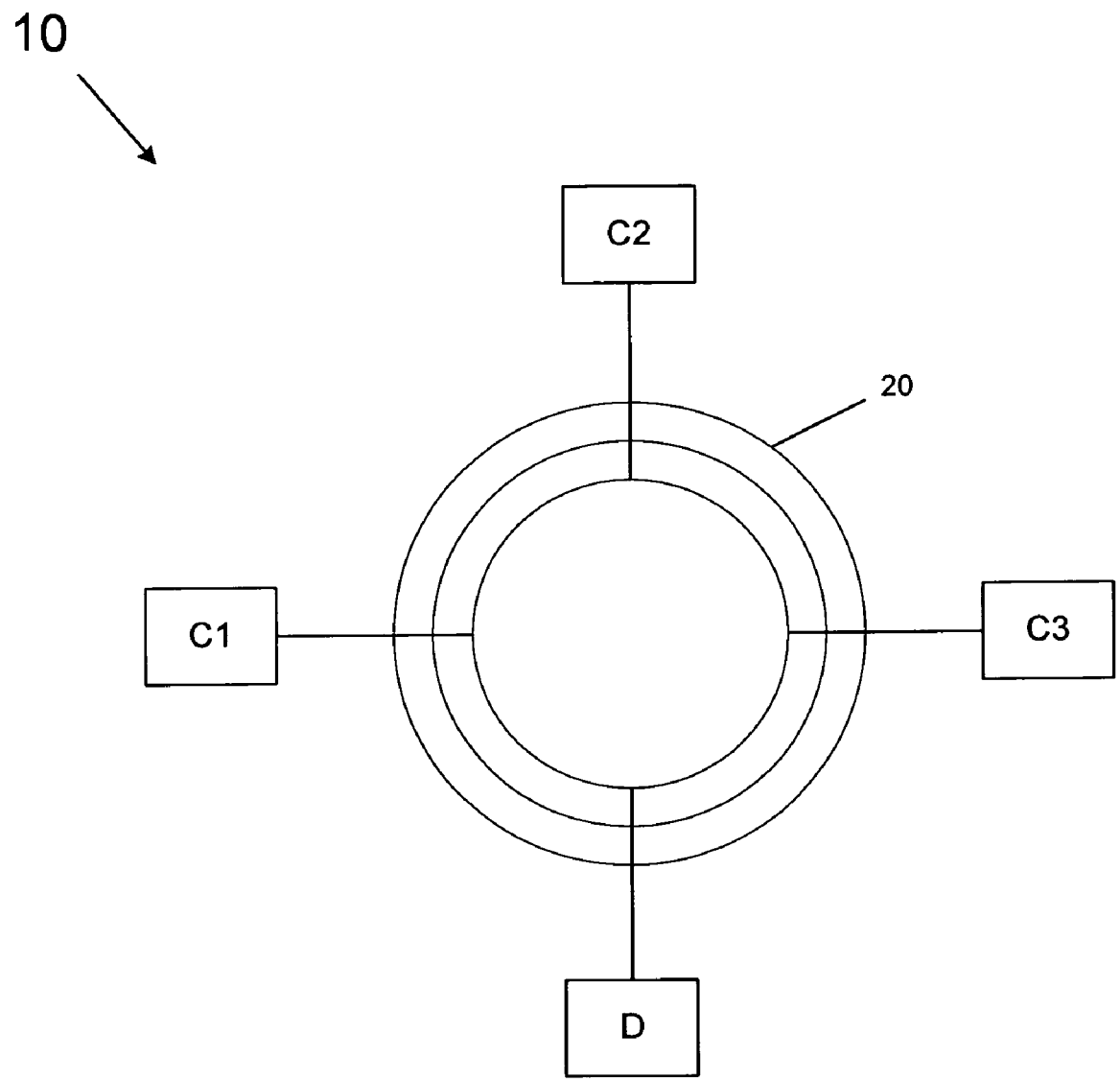
FIG. 1 is a block diagram of a portion of a system in accordance with one embodiment of the present invention.

Referring now to FIG. 1, shown is a block diagram of a portion of a system in accordance with one embodiment of the present invention. As shown in FIG. 1, system 10 includes a plurality of caching agents C1-C3. Each such caching agent may include or have access to a cache memory, and in various embodiments may be processor sockets, cores, or other such processing units that include or are associated with a cache memory. Each of caching agents C1-C3 are coupled via an interconnect 20, which may be a ring interconnect. As shown in the implementation of FIG. 1, ring interconnect 20 may include three independent message paths for carrying request, response, and data packets, respectively, although the scope of the present invention is not limited in this regard.

In addition to caching agents, as shown in FIG. 1 a directory D is present. Directory D may be part of a home agent or other unit that manages a cache coherency protocol and enables coherent access to information stored in the various caching agents C1-C3. For example, directory D may include a table that stores information in various entries regarding the location of cache lines stored in the caching agents C1-C3, as well as their state. In some embodiments, the home agent may also be used to access main memory, when requested data is not present in any of the caching agents.

Thus when a caching agent seeks to access data exclusively or for shared access, it may send a request such as a request for exclusive ownership (RdO), or request for shared data (RdS) to directory D to obtain the requested data. As will be described further below, system 10 may implement a cache coherency protocol in which certain acknowledgement messages can be sent to directory D after a corresponding data message is sent by a forwarding caching agent to a requestor (e.g., a cache-to-cache forwarding message) such that reduced bandwidth and latency can be realized on interconnect 20. Note for the ring interconnect architecture of FIG. 1, it may be assumed that there is no ordering between any source-destination pair across ring interconnect 20, however messages that are not bounced (i.e., data and response messages) can be assumed to be delivered in-order between any two caching agents for the same message class.

As will be described further below, directory D may include an array including metadata for the information stored in various caches of system 10. Still further, directory D may include one or more queues to hold pending requests, both requests that have been processed, as well as pending requests that cannot yet be processed due to a conflict or other reason. While the scope of the present invention is not limited in this regard, in some implementations the cache coherency protocol may be implemented using a MESI (modified, exclusive, shared, invalid) or MESIF (modified, exclusive, shared, invalid, forwarded) protocol.

Consider now a transaction for a Read For Ownership (RFO) request to a cache block (e.g., A1) by caching agent C1 that currently is held by caching agent C2 in the M state. Assume further C3 also makes an RFO request to the same cache block and the request arrives at directory D before C2's request has been completely processed. In other words, this second request is a concurrent request for the same data.

Figure 2:
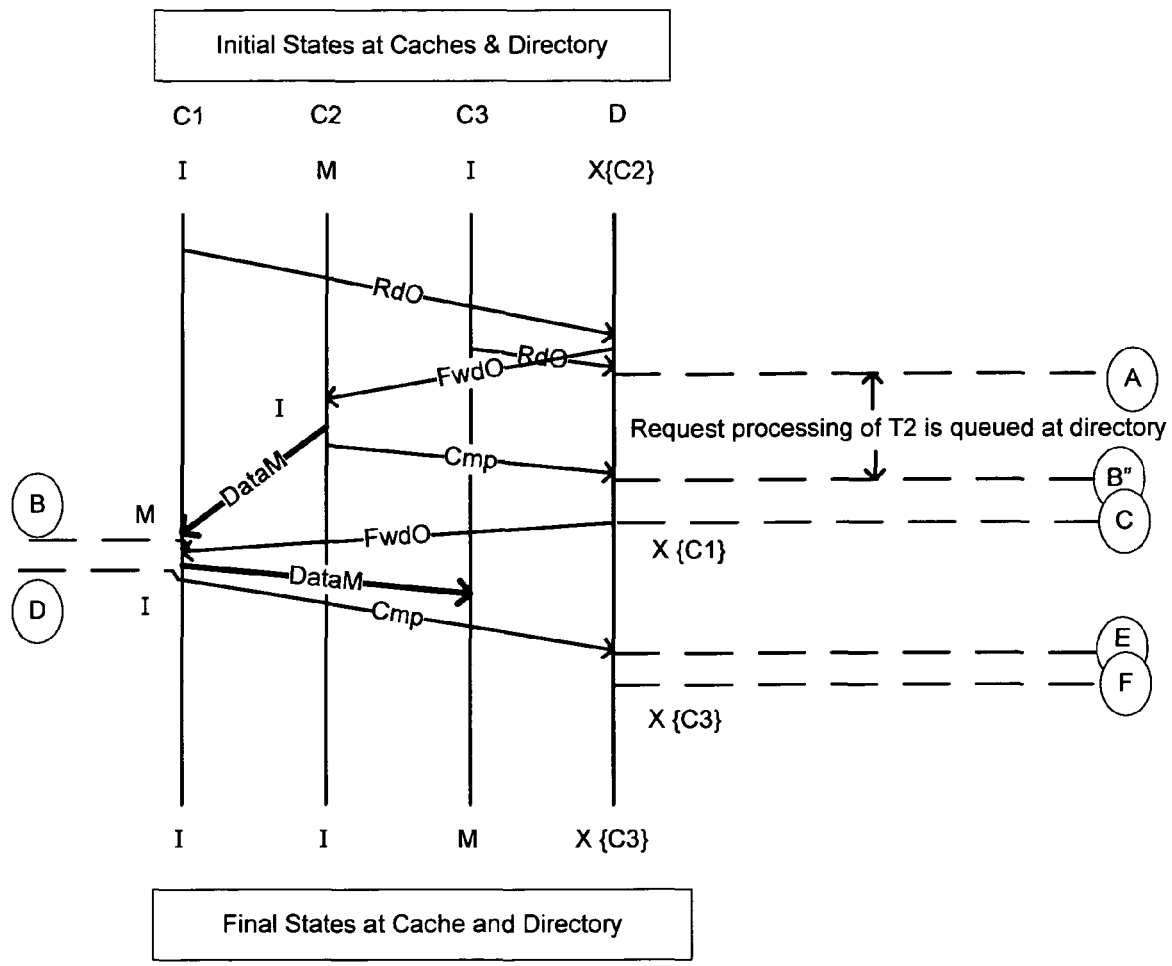
FIG. 2 is a flow diagram of protocol processing in accordance with one embodiment of the present invention.

The message flow with pure private caches is illustrated in FIG. 2 below, which is a flow diagram of protocol processing in accordance with one embodiment of the present invention. The directory holds pending concurrent requests to a cache block in a queue, and services them in first-in-first-out (FIFO) order of arrival. FIG. 2 also illustrates the state transitions made at each caching agent and the directory. The names of the various messages shown in FIG. 2 (RdO, FwdO, etc.) are mnemonics, and may have different labels in different implementations. Generally these names include a message type abbreviation (e.g., read (Rd), forward (Fwd), etc.), and a requested cache state (from the caching agent to the directory), a requested forwarding state (from directory to snooped cache), or a transition cache state (from cache to cache, or directory to cache) abbreviation (e.g., one of MESI).

As shown in FIG. 2, at an initial time, caching agents C1-C3 have the following states: C1 and C3 are in the invalid (I) state and C2 is in the modified (M) state, indicating that the caching agent C2 holds the only valid copy of the data, exclusively. Thus directory D indicates that C2 holds the exclusive copy of the valid data. As shown in FIG. 2, caching agent C1 sends a request to directory D for this data, namely a read for exclusive ownership (RdO) request. Upon receipt of this request, directory D may lookup the corresponding entry in its table to determine that the valid exclusive copy of the data is in caching agent C2. Thus directory D sends a snoop request (e.g., a forward request (i.e., FwdO)) to caching agent C2. Note that caching agent C3 thereafter makes a similar request for the same data and thus caching agents C1 and C3 seek concurrent access to the same data. Accordingly, at time A, directory D stores the request from caching agent C3 into a request FIFO queue.

Referring still to FIG. 2, when caching agent C2 receives the forward request from directory D, it invalidates its copy of the cache line and sends the requested data directly to caching agent C1 as a response to the snoop request. The data message contains the actual data modified by the responding cache, and the message type mnemonic (i.e. DataM) indicates the MESI state that the receiving cache C1 should transition to (i.e. M). Note that caching agent C2 does not send a completion (CMP) response back to directory D until after it sends the requested data off to caching agent C1. As seen in FIG. 2, when this completion message is received at directory D, the request from caching agent C3 can be de-queued at time C. The time B" to C reflects the amount of time that the directory must wait (maybe zero), to ensure that the caching agent C1 sees the data message (DataM) at least one cycle before the snoop message (FwdO) from the directory. Since we assume a bufferless ring interconnect as the underlying interconnect, this time can be accurately computed by any agent on the ring. At this time the directory D can send the snoop request (i.e., forwarding request (FwdO)) to caching agent C1 so that the requested data can be forwarded to caching agent C3.

Still referring to FIG. 2, responsive to this request, caching agent C1 may send a response to the snoop request (e.g., a data message (DataM)) to caching agent C3 including the requested data, and thereafter send a completion (CMP) message back to directory D. At this time, caching agent C1 will make its copy of the cache line invalid (I), in accordance with the standard rules for coherence protocol. Thus after conclusion of processing shown in FIG. 2, caching agents C1 and C2 include invalid copies of the line, while the modified valid copy of the line is present in caching agent C3, as indicated by the corresponding directory entry.

Due to the protocol processing shown in FIG. 2, various other coherency protocol messages that would otherwise need to be sent can be avoided. For example, instead of the flow described above, if completion messages were required to be sent to directory D before D can begin processing of any queued requests, it would result in additional messages and wasted bandwidth on the interconnect. Still further, a greater latency would be incurred while the concurrent request from caching C3 is queued in directory D. That is, in various embodiments any forwarding requests arriving at caching agent C1 after time B can be processed by caching agent C1 without the need for an interim completion message from caching agent C1 back to directory D. Furthermore, the knowledge of the message properties of a bufferless ring such as that of FIG. 1 can be leveraged to accurately estimate message traversal time between two agents on ring interconnect 20.

Thus in various embodiments, a caching agent is controlled such that it always injects a completion message to a snoop request back to a directory on a ring interconnect after it first injects a snoop response (e.g., a data message) to the requester. In this way, a directory can then inject a snoop request for a concurrent request to the ring interconnect after a minimal and predetermined delay of time, which may be zero or more cycles. This delay of time may be computed based at least in part on the arrival of the completion message from the caching agent and the relative locations of the requesting caching agent, the forwarding caching agent and the directory D.

In one embodiment, assuming a unidirectional ring (the algorithm holds for bidirectional rings as well, the time duration computation described below can be modified), and the following values for different topological parameters:

number of hops from a second requestor (C2) to a directory=N;
number of hops from a first requester (C1) to the directory=M;
number of hops from C1 to C2=P;
delay between ring stops (i.e., time taken in cycles for a ring message to move from one hop to another)=D; and
time (in cycles) after arrival of completion message that the directory must wait before initiating a forwarding request to C1=T.

The following equation can be used in one embodiment:

$$T=(P-N-M+1)*D \qquad [EQ. 1]$$

The extra cycle (i.e., "+1") ensures that the forwarding request from the directory arrives at the caching agent (C1) at least one cycle after the data message has been received by the agent. The computation assumes that both data and completion messages were injected into the ring stop in the same cycle, and that the data message was injected before the completion message. In some situations, T can be less than zero, in which case the directory can immediately inject the forwarding request into the ring destined for C1.

Note that this analysis makes the following assumptions for all caching agents: (1) when a forwarding request is received by any caching agent, the caching agent first puts the forwarded data and state to the requestor before sending the response to the directory. Both messages may be injected in the same cycle, but under no circumstance can the completion message be injected before the data message has been injected into the data ring; (2) messages from the ring stop to the protocol agent on the same ring stop are processed in order of arrival at the ring stop by the protocol agent; (3) messages destined to the ring stop from the protocol agent at this ring stop are injected in order of their generation by the protocol agent; (4) there is no bounce (i.e., buffers are pre-reserved when requests are made by caching agents) for response and data message channels; (5) time duration for delivery of messages between any two ring stops for response and data messages can be accurately predicted by all agents on the bufferless ring; and (6) Equation 1 assumes the same size for all packets. Note that for different sized packets, the time duration computation can be modified to accommodate the packet size.

In one implementation, at least one message can be eliminated in the coherence protocol flow, in addition to significantly reducing the time taken for concurrent accesses to the same address (conflicting or otherwise). Such protocol may also significantly reduce latencies for barrier synchronization, in which multiple agents contend for ownership to the same cache block in a concurrent fashion.

To quantify the latency reduction obtained in an embodiment of the present invention for a cache-to-cache forwarding case, the amount of time taken for barrier synchronization processing with all threads participating may be examined. Barrier synchronization is a mechanism for a thread to wait at a "sync" point until all other members in the group reach the same sync point, at which time all threads are "released" from the barrier and continue normal processing. In barrier synchronization processing, every thread upon reaching the barrier, increments the barrier count by one, checks for the value of the barrier to see if all threads have reached the barrier, and goes into a busy-wait state otherwise. To keep the quantification simple, assume that the barrier-sync cache block moves around in the M state with no intervening S states.

Assuming that the total time for a packet to traverse the entire ring is T cycles, and assuming a bidirectional ring that in effect reduces the maximum latency for any packet to T/2 cycles, and that all agents are uniformly randomly distributed over the ring, the following equation represents the latency for one agent to acquire and update the synchronization variable. Specifically, the latency in cycles to complete processing of a request, remembering that the directory in the average case will have to wait for an average of T/8 cycles before accepting a second request to the same address is as follows:

$$\text{Latency} = (T/4 + T/4 + T/4 + T/8) = 7T/8 \text{ cycles} \quad [\text{EQ. 2}]$$

Note that this latency reduction is expressed in terms of the amount of time request processing to a conflicting address would have to wait before being processed according to a conventional method (i.e., T cycles). Similarly, for a conventional method processing a pair of concurrent requests, the time taken in cycles would be:

$$\text{Latency} = 2*T \text{ cycles}$$

Instead in accordance with one embodiment of the present invention, the total latency can be arrived as follows. For the best case scenario, the FwdO message from the directory would arrive exactly a cycle after the requestor has received the data. Assuming that protocol processing overheads in both cases are the same, and hence can be ignored:

$$\text{Latency} = (T/4 + T/4 + T/4) + 1 + T/4 = T + 1 \text{ cycles [Best case]} \quad [\text{EQ. 3}]$$

For the worst case scenario, assume that it takes T/4 cycles for the snoop message to arrive at the requestor after it has seen the data. In such a case, the latency would be:

$$\text{Latency} = (T/4 + T/4 + T/4) + (T/4 + T/4) = 5T/4 \text{ cycles [Worst case]} \quad [\text{EQ. 4}]$$

In the average case, hence, it can be argued that the delay observed for the snoop by caching agent C1 after it has seen the forwarded data would be ~T/8 cycles. So, in the average case, the latency for barrier synchronization with two threads participating (assuming that the second thread's request arrives before the first thread's request has been completely processed) can be expressed by the following equation:

$$\text{Total Latency} = (3T/4) + (T/8 + T/4) \text{ [Average case, for 2 threads, barrier synchronization]} \quad [\text{EQ. 5}]$$

$$= 3T/4 + 3T/8$$

$$= 9T/8 \text{ cycles.}$$

Equation 5 thus is a generic equation for reduction in the total time for concurrent accesses, with X accesses arriving with at least one transaction currently pending for the same address. Note that it is not necessary that all X accesses arrive before the first transaction has completed, only that when a transaction (from the second one onward) arrives, there is a transaction currently in progress. This would usually be the case in barrier synchronization, especially for large scale systems with many cores.

To summarize, a latency reduction observed for a transaction pending at the directory due to a concurrent access by a different agent to the same cache block may be approximately=(T−7T/8)=T/8 cycles. Further, total latency for completion of concurrent accesses, assuming X back-to-back accesses, with each (except the first) arriving at the directory when there is currently a transaction in progress to the same address at the directory is 3T/4+X*(3T/8). Hence, reduction in the overall system latency compared to a conventional method is T/4+X*5T/8.

Reduction in bandwidth on an acknowledgement ring, based upon the assumption that all transactions involve cache-to-cache transfers, can be calculated by observing that there must be two messages in a conventional case, and according to one embodiment, there is only one message on this channel. Hence, reduction in bandwidth on the acknowledgement ring, assuming all transactions are cache to cache transfers is 50%.

Embodiments thus improve the latency of concurrent requests to the same cache block by reducing the time spent queued at a directory, and decreasing the number of messages necessary for completing the coherence operations associated with obtaining the cache block. It is thus both a latency reduction and bandwidth saving technique. Embodiments may use timers at the directory for accurately determining when a particular agent is guaranteed to have received a forwarded message from a peer cache. In addition, embodiments may use hardware support for ensuring ordering of messages.

Embodiments thus reduce the time taken for concurrent coherence operations in a non-retry directory-based coherence protocol to the same cache block. These operations are fairly common among multithreaded recognition, mining and synthesis (RMS) workloads that do frequent barrier synchronization. Embodiments thus exploit the properties of the underlying interconnect for reducing latency and message count in coherence operations.

In various embodiments, certain hardware structures may be provided to ensure ordering across message classes (e.g., Response and Data) for snoop responses at a protocol engine (PE) ring interface, and for completion messages. One mechanism may be to have a single first-in-first-out (FIFO)

structure for all message classes (Request, Response & Data) at all caching agents, but such implementations could be detrimental to performance.

Thus in other embodiments, combinatorial logic between the protocol engine and the ring agent may be provided. More specifically, this hardware structure can be located between a response queue and a data queue that are coupled between the protocol engine to the ring stop. This logic may prevent a completion response from being injected into the acknowledgement (AK) ring before the corresponding data response to the original requester has been injected into the bufferless (BL) ring. This logic can take different forms depending upon the nature of the individual queue(s) and their drain properties.

In a FIFO embodiment for each queue, a tag, e.g., an 8-bit tag (much greater than the number of entries in the FIFO queue) can be attached to snoop responses and completion messages by the protocol engine (the response generating entity). Then a comparator circuit can be coupled at the head of the completion queue. When the completion response reaches the head of the queue, and before it is injected into the AK ring, the completion response is checked against the head of the data queue. If the head entry tag in the data queue has a lower value than the tag in the completion entry, then the data response has not been injected into the BL ring yet. On the other hand, if it has an equal or higher value, then the data response will either be injected in the same clock cycle or has already been injected into the BL ring.

Figure 3:
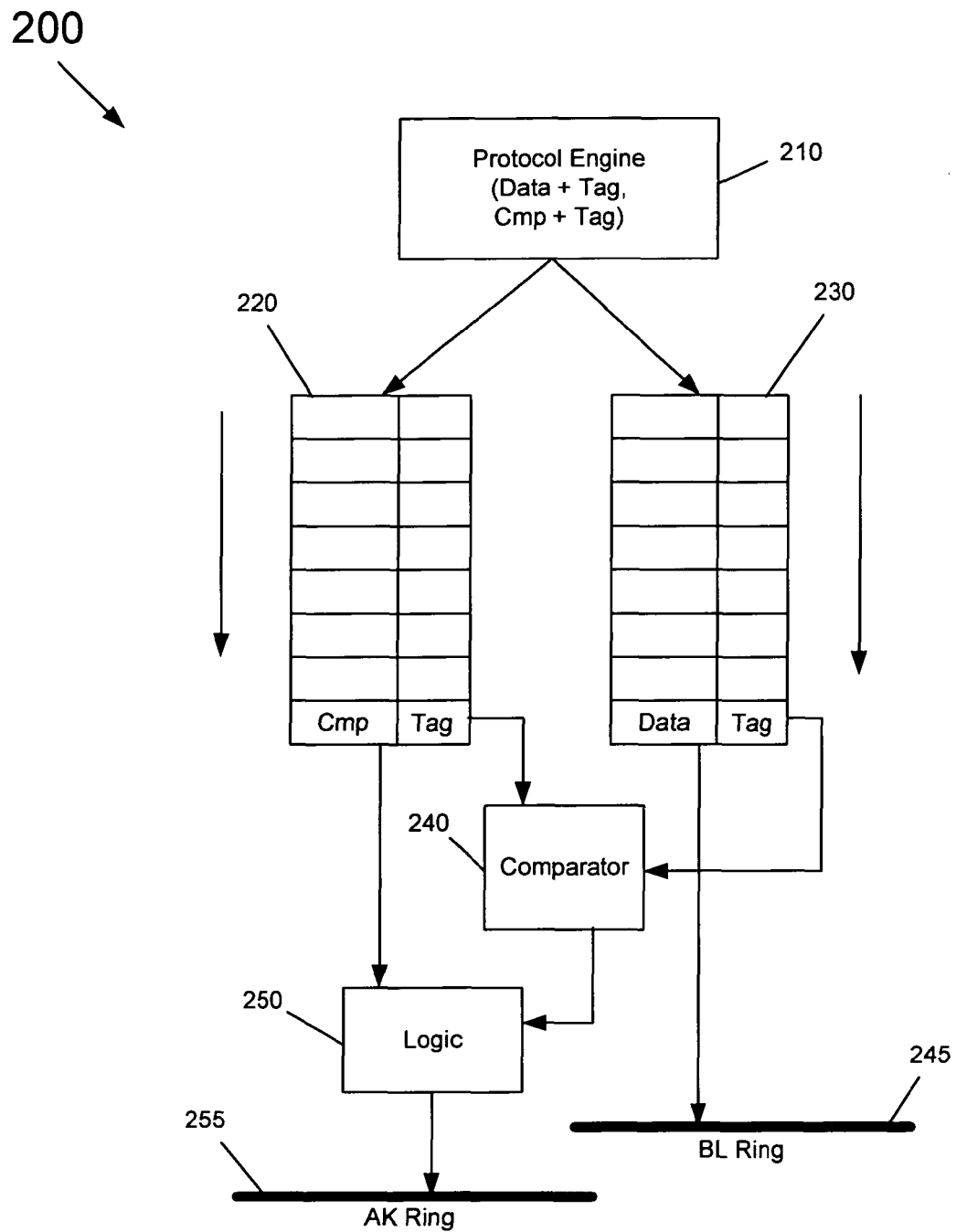
FIG. 3 is a block diagram of an output sequencer in accordance with one embodiment of the present invention.

Referring now to FIG. 3, shown is a block diagram of an output sequencer in accordance with one embodiment of the present invention. As shown in FIG. 3, output sequencer 200 may be used to order snoop responses from a protocol engine 210 to a ring stop formed of connections to multiple rings of a ring interconnect, e.g., a bufferless ring 245 on which data is communicated and an acknowledgement (AK) ring 255 on which completion and other such acknowledgement messages are sent.

As shown in FIG. 3, protocol engine 210 may generate data messages and completion messages including a tag associated with each set of messages, e.g., an 8-bit tag. These messages, which are to be sent out on the associated rings, are provided to a corresponding one of queues 220 and 230, namely a completion queue 220 and a data queue 230, which may be adapted as FIFO buffers, in one embodiment. As shown in FIG. 3, the head entry of completion queue 220 may be provided to a comparator 240, where it is compared with the head of data buffer 230. The comparison may indicate whether the tag of completion buffer 220 has a value less than that of the data tag, meaning that the corresponding data message has yet to be injected into ring 245. Accordingly, the output of comparator 240 may be used by logic 250 to prevent that entry at the head of completion queue 220 from being injected into acknowledgement ring 255. While shown with this particular implementation in the embodiment of FIG. 3, the scope of the present invention is not limited in this regard.

To ensure that a snoop injected from a ring stop does not overtake a forwarded data response on its way from the ring stop to the protocol engine, a content addressable memory (CAM) may be provided on the input path. The CAM on the input path causes every snoop request from the directory to CAM an input queue and catch an "in-flight" data packet (with state information) destined to the cache/core.

If the data is caught in the data queue, the snoop is blocked, until the data message for the same address has been injected into the cache controller. This allows the cache to supply data to the core, for the core to consume it and perform at least one operation (for e.g., in case of an RFO request for which this data is supplied to overwrite the data with the new value), before the cache block gets snooped out by the pending snoop.

Figure 4:
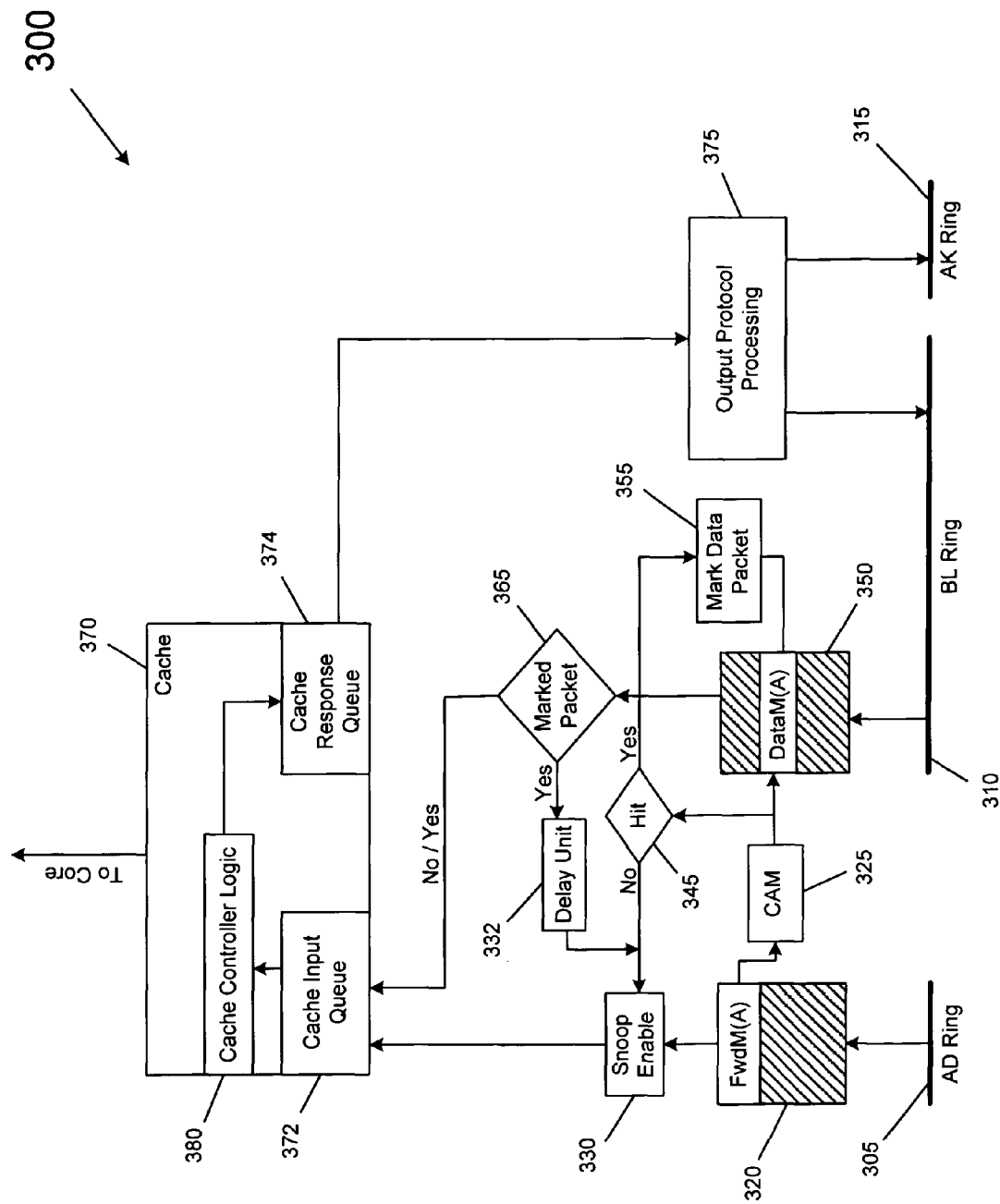
FIG. 4 is a block diagram of input path structures in accordance with one embodiment of the present invention.

Referring now to FIG. 4, shown is a block diagram of input path structures in accordance with one embodiment of the present invention. As shown in FIG. 4, a given caching agent may be coupled to multiple rings, namely a request (i.e., AD) ring 305, a data ring (i.e., BL ) ring 310, and an acknowledgement ring (i.e. AK) ring 315. Based upon one embodiment, even though a snoop request is guaranteed to arrive at the ring stop at least one cycle after the forwarded data from the peer cache, it is possible that the snoop may actually be seen by the caching agent before the forwarded data is observed. This would result in inconsistent response by the caching agent to the directory. To prevent such an occurrence, a scheme involving a Content Addressable Memory (CAM) 325 is provided. Every incoming snoop performs a cache block address lookup in an incoming protocol data queue 320 for any messages that might be in-flight. If there are no messages, the snoop is enabled via snoop enable logic 330, and sent into the cache controller 380 of cache 370, via cache input queue 372. If there is a data message for the same cache block (at 345), then that data packet is marked (block 355) in data response protocol queue 350, and the snoop is kept pending. As the incoming data response protocol FIFO queue 350 is drained, if a marked packet is encountered (at 365), the snoop enable logic 330 is turned on after a fixed delay via delay unit 332. This allows the snoop at the top of the incoming snoop queue 320 to be released. The protocol processing inside cache controller 380 thus remains unchanged. The output protocol processing 375 includes the output sequencer that ensures that the data message that is part of the snoop response received from cache response queue 374 is placed on BL ring 310 at least one clock before the completion message is placed on the AK ring 315. While shown with this particular implementation in the embodiment of FIG. 4, the scope of the present invention is not limited in this regard.

By introducing CAM structures for lookups between first and second input queues, explicit write back (EWB) (M copy eviction) and fill hint (S copy eviction) transactions may be realized with fewer number of messages. In conventional protocols, EWB requests and fill hints need to first consult the directory to check that there is no conflicting request in. progress, before actually evicting the line. By providing CAM structures, the EWB can proceed without such messages, and incoming snoops can "catch" the EWBs, since they will be resident in the protocol buffer FIFO structures until the EWB/Fill Hint completes. This may lead to better cache utilization.

Figure 5:
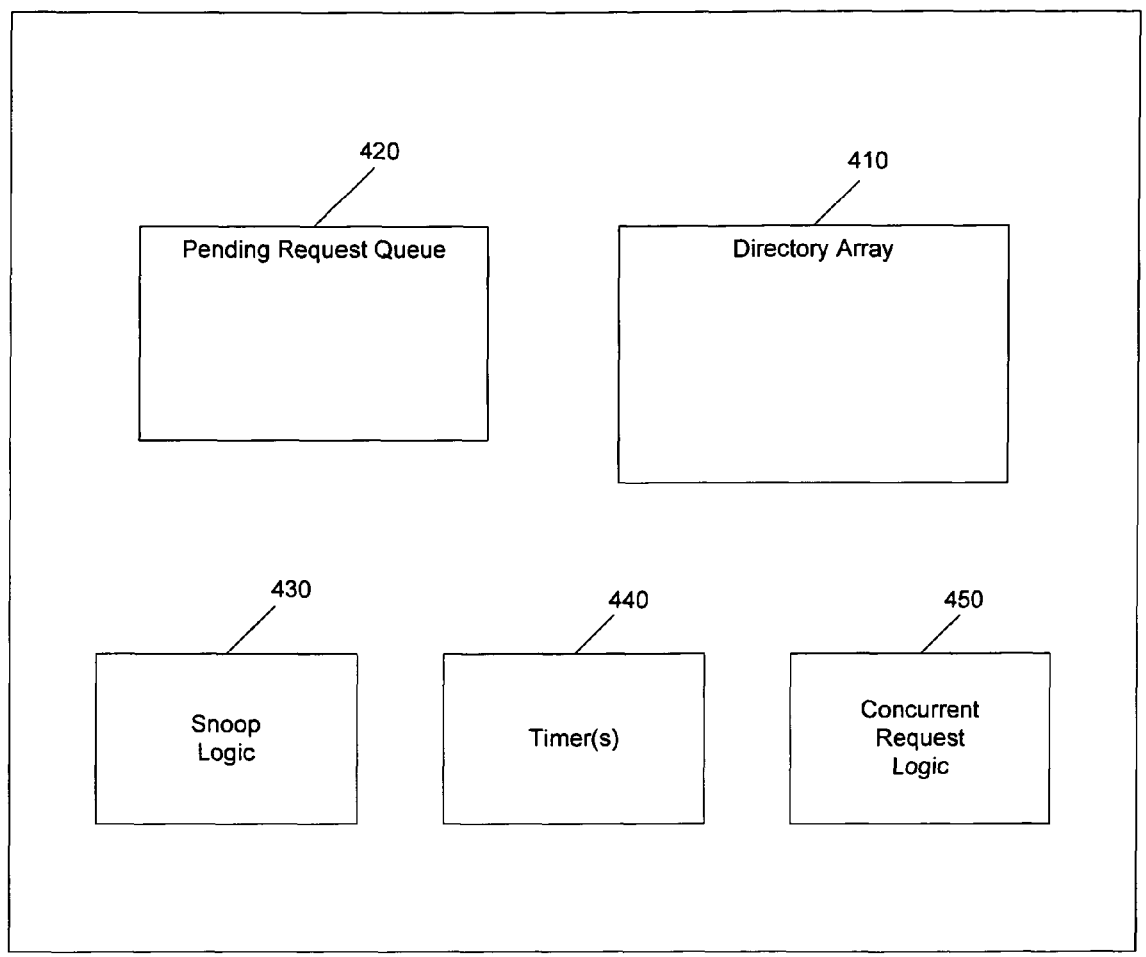
FIG. 5 is a block diagram of a directory in accordance with one embodiment of the present invention.

Embodiments may be implemented in a directory such as present in a home agent, in various implementations. Referring now to FIG. 5, shown is a block diagram of a directory in accordance with one embodiment of the present invention. As shown in FIG. 5, directory 400 which may be a directory of a home agent includes various structures to maintain information regarding cache lines stored in associated caches as well as certain control logic, queues, timers, among other such components that may be present in a given home agent directory.

As shown in FIG. 5, directory 400 may include a directory array 410 having a plurality of entries each of which may be associated with a given cache line in one of the caches with which directory 400 is associated. Each entry may include various information regarding the location of the cache line, as well as its state, among potentially other such information. Still further, directory 400 includes a pending request queue 420, which may be a storage to store various requests from different caching agents associated with directory 400. To determine whether a given request can be performed, it first may be determined whether any previous outstanding requests for the same cache line are already present in request queue 420.

As further shown in FIG. 5, snoop logic 430 may be present. Such logic may be used to analyze incoming requests as well as information in directory array 410, to enable transmission of various snoop requests to the different caching agents. Still further, embodiments may include a concurrent request logic 450 that may be used to handle situations where multiple requests for a single cache line are incoming to directory 400. For example, concurrent request logic 450 may determine presence of multiple concurrent requests for a single cache line and enable a quicker transmit of the second such concurrent request from directory 400, namely prior to receipt of a completion message associated with the first concurrent request. To this end, in connection with one or more timers 445, concurrent request logic 450 may determine a predetermined minimum time delay that the second concurrent request be stored in pending request queue 420 before it can be sent from directory 400. For example, one or more timers may be used to accurately time the predetermined number of cycles between a concurrent request can be sent from the directory to allow for aggressive processing of cache miss requests. While shown with this particular implementation in the embodiment of FIG. 5, the scope of the present invention is not limited in this regard.

Figure 6:
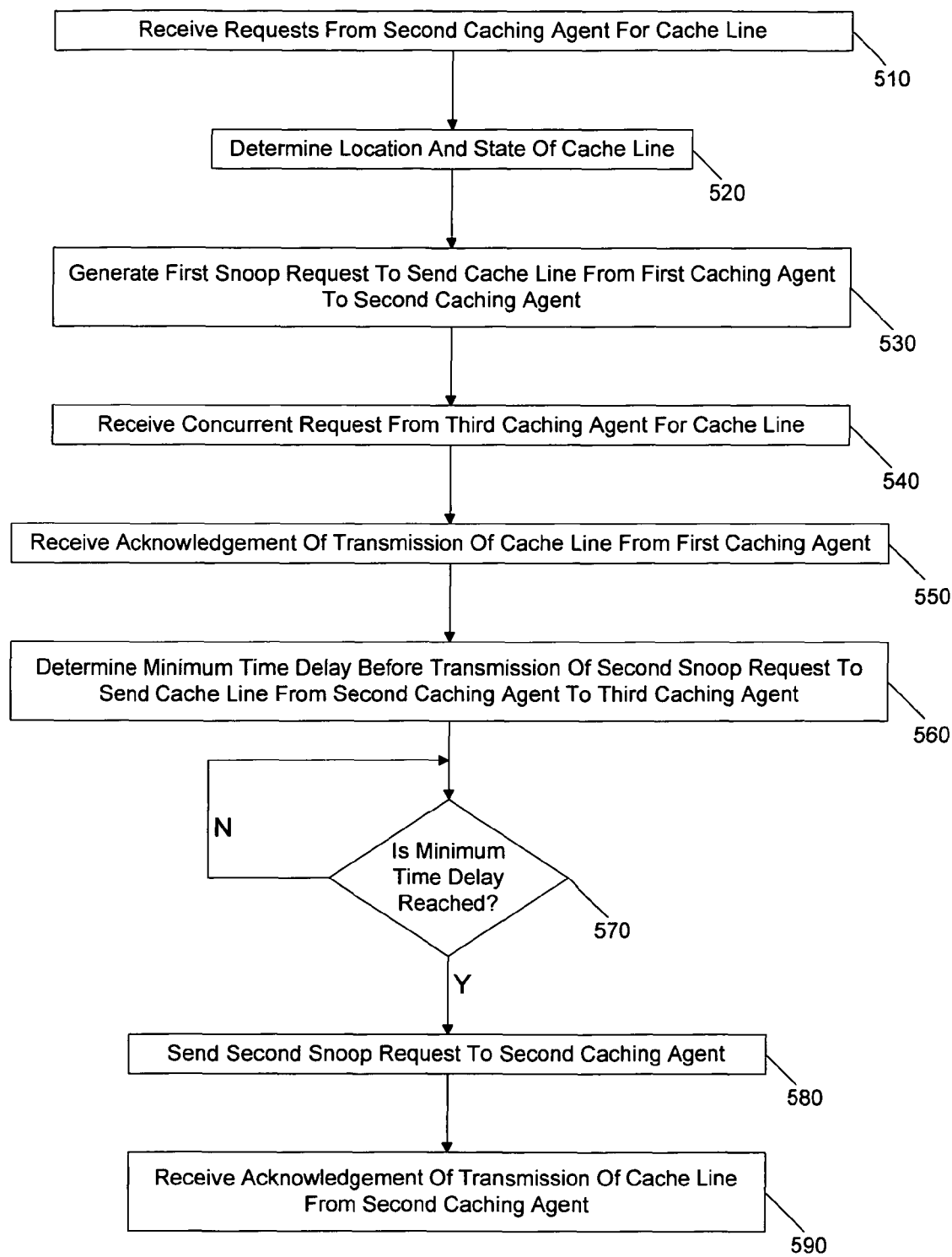
FIG. 6 is a flow diagram of a method in accordance with an embodiment of the present invention.

In one particular implementation, concurrent request logic 450 may handle such concurrent requests in accordance with the flow diagram of FIG. 6, below. Referring now to FIG. 6, shown is a flow diagram of a method 500 that may be used by a directory or other tracking structure to determine a minimum time delay before a concurrent snoop request can be sent in accordance with an embodiment of the present invention. As shown in FIG. 6, method 500 may begin by receiving a request from a second caching agent for a cache line (block 510). Based on the request, the directory may determine a location and state of the cache line (block 520). For example, the directory may determine that the cache line is present in a first caching agent. Accordingly, the directory may generate a first snoop request to send the cache line from the first caching agent to the second caching agent (block 530).

At some point, either prior to transmission of this first snoop request or subsequently thereto, but prior to the completion of the acknowledgement of the cache-to-cache forwarding, the directory may receive a concurrent request from a third caching agent for the same cache line (block 540). Accordingly, the directory may store the concurrent request, e.g., in a pending request queue or other such temporary storage such as a FIFO within the directory.

Thereafter, the directory may receive an acknowledgment of the transmission of the cache line between the first and second caching agents (block 550). Upon receipt of this acknowledgement at block 560, a minimum time delay may be determined. This time delay may be calculated as the period before the directory can transmit the second snoop request to request that the cache line be forwarded from the second caching agent to the third caching agent. In one embodiment, this calculation may be made in accordance with Equation 1. At diamond 570 it may be determined whether this minimum time delay has been reached, e.g., based on a timer in the directory. If not, diamond 570 may loop back on itself. When the time delay has been realized, the second snoop request may be sent to the second caching agent to cause the cache-to-cache forwarding (block 580). Then, the directory thereafter may receive an acknowledgment of that transmission (block 590) such that the pending request can be dequeued from its location in the queue. While shown with this particular implementation in the embodiment of FIG. 6, the scope of the present invention is not limited in this regard.

Figure 7:
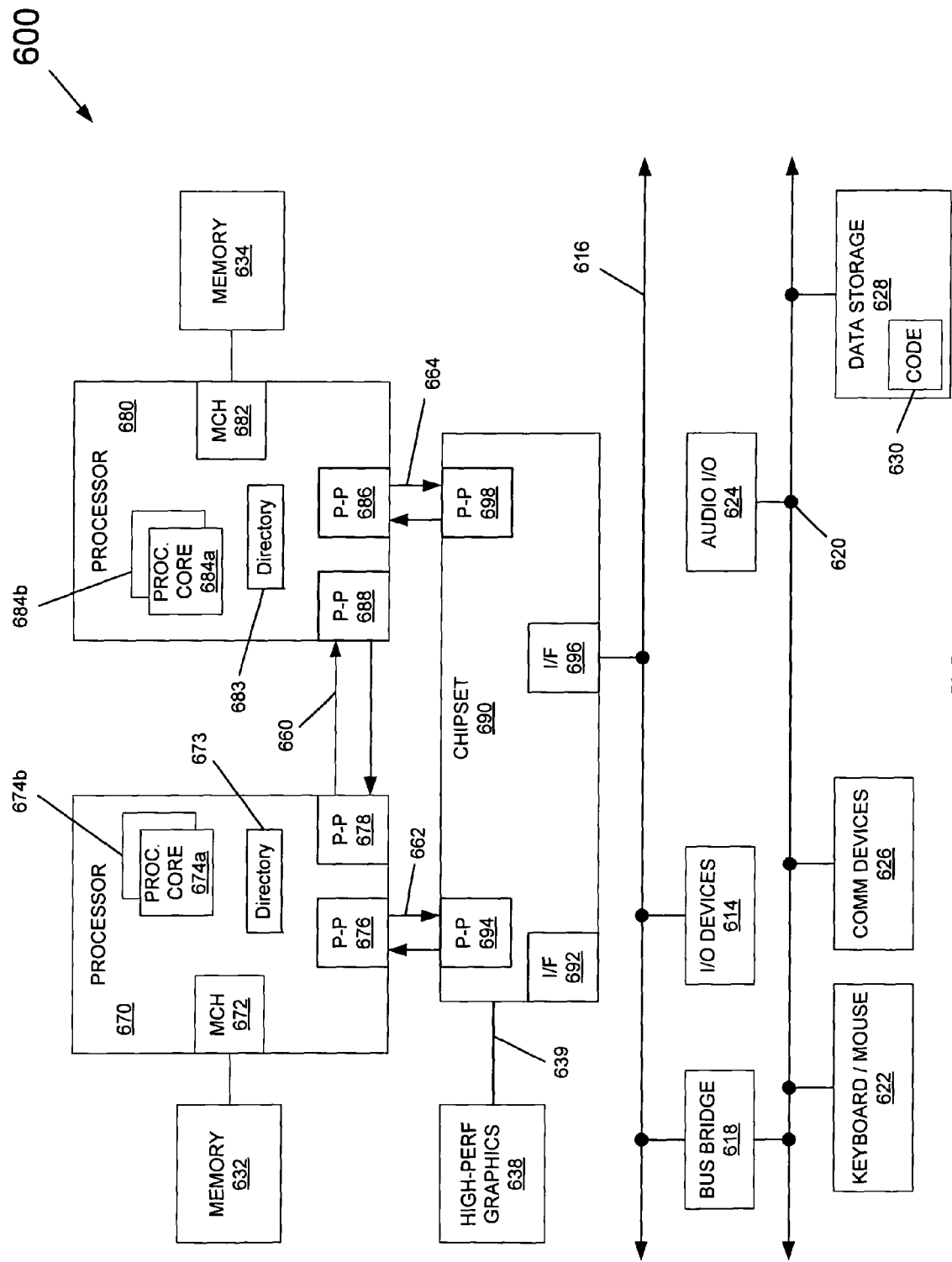
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), and a directory 673 and 683, which may be coupled to the cores via a bufferless ring interconnect. Each directory may include logic such as shown in FIG. 5 to enable transmission of concurrent snoop requests with minimal latency.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of main memory (e.g., a dynamic random access memory (DRAM)) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638. In turn, chipset 690 may be coupled to a first bus 616 via an interface 696. As shown in FIG. 7, various I/O devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining in a first caching agent whether a tag value associated with an entry for a completion message in a first queue is less than a tag value for a corresponding entry for a data message in a second queue;
   injecting the completion message to an interconnect coupled to a directory, the first caching agent, and a second caching agent, based at least in part on the determination, otherwise preventing injecting the completion message;
   receiving the completion message at the directory from the first caching agent to indicate that the first caching agent has sent a cache line to the second caching agent responsive to a first request for the cache line;
   upon receiving the completion message, calculating a time delay before the directory can send a second request to the second caching agent to forward the cache line to a third caching agent; and
   sending the second request after the time delay.

2. The method of claim 1, wherein the first caching agent sends the completion message after the first caching agent injects a corresponding data message including the cache line to the interconnect.

3. The method of claim 2, further comprising receiving the completion message on a first channel of the interconnect and sending the second request on a second channel of the interconnect.

4. The method of claim 1, further comprising:
   storing the cache line in the third caching agent in an incoming data queue;
   determining whether an incoming snoop request from the directory corresponds to the cache line; and
   if so, maintaining the incoming snoop request in a second queue until the cache line is drained from the incoming data queue.

5. The method of claim 4, further comprising sending a data message including the cache line from the third caching agent before sending a snoop response to the incoming snoop request.

6. The method of claim 1, further comprising evicting or sending a fill hint for a cache line from the first caching agent without sending an eviction transaction from the first caching agent to the directory.

7. An apparatus comprising:
   a plurality of caching agents each including a cache memory; and
   a directory coupled to the plurality of caching agents via an interconnect, and to store a plurality of entries each associated with a cache line stored in a cache memory of a caching agent coupled to the directory, the directory including first logic to determine a time delay (T) before the directory can send a concurrent snoop request according to $T=(P-N-M+1)*D$, wherein P corresponds to a number of interconnect hops from a first caching agent to a second caching agent, N corresponds to a number of interconnect hops from the second caching agent to the directory, M corresponds to a number of interconnect hops from the first caching agent to the directory, and D corresponds to the delay between ring stops on the interconnect, the concurrent snoop request concurrent with at least one other pending access to the same cache line.

8. The apparatus of claim 7, wherein the directory includes at least one timer to indicate when the time delay has been completed.

9. The apparatus of claim 7, wherein the directory is to send the concurrent snoop request to a first caching agent without receipt of a completion message from the first caching agent.

10. The apparatus of claim 7, wherein the concurrent snoop request is a request for a first cache line to be forwarded from a first caching agent to a second caching agent responsive to the concurrent snoop request.

11. The apparatus of claim 10, wherein the directory is to generate the concurrent snoop request responsive to a second request from the second caching agent, wherein the second request is received in the directory after a first request from the first caching agent for the cache line.

12. The apparatus of claim 11, wherein the directory is to store the second request in a requestor queue.

13. The apparatus of claim 11, wherein the directory is to de-queue the second request responsive to a completion message from a third caching agent that forwarded the first cache line to the first caching agent.

14. A system comprising:
   a multicore processor including a plurality of caching agents and a directory coupled to the plurality of caching agents via a ring interconnect including independent channels for snoop requests, data messages, and acknowledgement messages, the directory including concurrent request logic to calculate a time delay before the directory can transmit a concurrent snoop request to a first caching agent to cause a first cache line to be forwarded from the first caching agent to a second caching agent, the concurrent snoop request concurrent with another pending access to the first cache line, the time delay calculated upon receipt of a second acknowledgement message from a third caching agent to indicate transmission of the first cache line to the first caching agent and corresponding to a number of cycles between receipt of the second acknowledgement message and transmission of the concurrent snoop request, without receipt of a first acknowledgement message from the first caching agent to indicate receipt of the first cache line in the first caching agent, wherein the first caching agent is configured to prevent transmission of an acknowledgement message to the directory upon receipt of the first cache line from the third caching agent; and
   a dynamic random access memory (DRAM) coupled to the multicore processor.

15. The system of claim 14, wherein the concurrent request logic is to calculate the time delay based at least in part on properties of the ring interconnect.

16. The system of claim 14, wherein the directory includes at least one timer to indicate when the time delay has been completed.

* * * * *